US 8,251,388 B2

(12) United States Patent
Sauceda et al.

(10) Patent No.: US 8,251,388 B2
(45) Date of Patent: Aug. 28, 2012

(54) BICYCLE CHILD SEAT

(75) Inventors: Carlos J. Sauceda, San Jose, CA (US);
Allen C. Young, Del Mar, CA (US)

(73) Assignee: Bell Sports, Inc., Scotts Valley, CA (US)

( * ) Notice: Subject to any disclaimer, the term of this patent is extended or adjusted under 35 U.S.C. 154(b) by 32 days.

(21) Appl. No.: 12/550,807

(22) Filed: Aug. 31, 2009

(65) Prior Publication Data
US 2010/0052283 A1 Mar. 4, 2010

Related U.S. Application Data

(60) Provisional application No. 61/094,146, filed on Sep. 4, 2008.

(51) Int. Cl.
*B62J 11/00* (2006.01)
(52) U.S. Cl. .................. 280/202; 224/415
(58) Field of Classification Search .......... 280/202, 280/288.4, 304.4, 33.993, 292, 648, 727, 280/32.7; 224/415, 419, 421, 448; 297/195.13, 297/250.1, 256.15, 256.16, 156.17, 285, 297/183.3
See application file for complete search history.

(56) References Cited

U.S. PATENT DOCUMENTS

| | | | | |
|---|---|---|---|---|
| 453,212 A * | 6/1891 | Sager | .......................... | 297/129 |
| 3,099,486 A * | 7/1963 | Scott | .......................... | 297/465 |
| 3,802,598 A * | 4/1974 | Burger et al. | ................. | 280/202 |
| 4,022,488 A * | 5/1977 | Likas | ............................ | 280/202 |
| 4,051,985 A * | 10/1977 | Berger | ........................ | 224/415 |
| 4,053,091 A * | 10/1977 | Martelet | ...................... | 224/415 |
| 4,902,070 A * | 2/1990 | Casale et al. | ................. | 297/238 |
| 4,964,551 A * | 10/1990 | O'Donovan et al. | ......... | 224/415 |
| 4,998,744 A * | 3/1991 | Drexler | ......................... | 280/202 |
| D339,477 S * | 9/1993 | Kain | .............................. | D6/333 |
| 5,299,818 A * | 4/1994 | Newbold | ...................... | 280/202 |
| 5,884,922 A * | 3/1999 | Pickering | ..................... | 280/7.17 |
| 5,902,016 A * | 5/1999 | Moran et al. | .................. | 297/484 |
| 6,173,980 B1 * | 1/2001 | Newbold et al. | .............. | 280/202 |
| D483,548 S * | 12/2003 | Chambers | ...................... | D2/627 |
| 7,052,026 B2 * | 5/2006 | Sutherland | .................... | 280/204 |
| 7,794,015 B1 * | 9/2010 | Ashby | .......................... | 297/248 |
| 2002/0121535 A1 * | 9/2002 | Moore et al. | .................. | 224/427 |
| 2004/0108758 A1 * | 6/2004 | Eastman et al. | ........... | 297/250.1 |
| 2007/0052269 A1 * | 3/2007 | Chen et al. | ................. | 297/250.1 |
| 2007/0057543 A1 * | 3/2007 | Nakhla | ....................... | 297/250.1 |
| 2008/0143158 A1 * | 6/2008 | Roodenburg et al. | ...... | 297/284.4 |
| 2008/0211278 A1 * | 9/2008 | Macliver | ................... | 297/250.1 |
| 2010/0013187 A1 * | 1/2010 | Oxley | ........................... | 280/402 |

* cited by examiner

*Primary Examiner* — Tashia Adams

(74) *Attorney, Agent, or Firm* — Baker Botts L.L.P.

(57) ABSTRACT

The teachings of the present disclosure relate to a bicycle child seat. The bicycle child seat may include a seat sized for a child, a safety harness configured to secure the child in the bicycle child seat, a bicycle frame attachment mechanism, and a seat post attachment mechanism. The seat may include a hole configured to slide over the seat post of the bicycle.

5 Claims, 10 Drawing Sheets

BICYCLE CHILD SEAT

RELATED APPLICATION

This application claims the benefit of U.S. provisional patent application Ser. No. 61/094,146 filed Sep. 4, 2008, entitled "BICYCLE CHILD SEAT," the contents of which is hereby incorporated by reference in its entirety.

TECHNICAL FIELD

This invention relates generally to bicycle accessories, and more particularly, to a bicycle child seat.

BACKGROUND

A typical bicycle includes two wheels attached to a rigid or semi-rigid frame, a seat, and a handlebar. A gear set allows the rider to propel the rear wheel of the bicycle by pushing pedals with his or her feet. Users typically steer the bicycle by turning the front wheel with the handlebar. Although there are tandem bicycles available, most bicycles are configured for one rider at a time.

Child bicycle seats allow a bicycle rider to securely carry a child while riding. A child bicycle seat may include a rigid seat made of plastic or metal and a safety harness designed to restrain the child. Most child bicycle seats attach to the frame of the bicycle. Some examples, however, attach to a luggage rack engaged with the bicycle frame. Some child bicycle seats include footwells, padded seats, and additional features like reclining seats or foot straps.

SUMMARY OF THE INVENTION

In accordance with teachings of the present invention, a child bicycle seat configured to attach to a bicycle is provided. The bicycle child seat may include an upper portion, a lower portion including a seat for a child, a plurality of connectors configured to attach the upper portion to the lower portion, and a safety harness configured to secure a child in the bicycle child seat.

In another example, a bicycle child seat configured to attach to a bicycle is provided. The bicycle may include a saddle, a saddle post, and two saddle stays. The bicycle child seat may include a seat sized for a child, a safety harness configured to secure the child in the bicycle child seat, a bicycle frame attachment mechanism, and a seat post attachment mechanism. The seat may include a hole configured to slide over the saddle post of the bicycle.

In another example, a bicycle child seat configured to attach to a bicycle is provided. The bicycle may include a saddle and a saddle post. The bicycle child seat may include a seat sized for a first child, a safety harness configured to secure the first child in the bicycle child seat, a bicycle frame attachment mechanism, a seat post attachment mechanism, and one or more features allowing a user to convert for use with a second child.

The embodiments described and shown in the present disclosure may provide a variety of benefits in comparison to other child bicycle seats. For example, a child bicycle seat with an upper portion and a lower portion may be disconnected for storage or shipping. In addition, separate manufacture of the two portions may provide efficiency in mold size or other fabrication concerns. In another example, a child bicycle seat including a hole configured to slide over the saddle post of the bicycle may provide a redundant safety feature in the event one or more attachment mechanisms fail. These and other available benefits will be discussed in the following disclosure.

BRIEF DESCRIPTION OF THE DRAWINGS

A more complete and thorough understanding of the present invention and advantages thereof may be acquired by referring to the following description taken in conjunction with the accompanying drawings, in which like reference numbers indicate like features, and wherein.

DETAILED DESCRIPTION

The present disclosure relates to novel designs for a bicycle child seat. Particular example designs are illustrated in detail in the accompanying figures, which are described below.

Figures 1A, 1B:
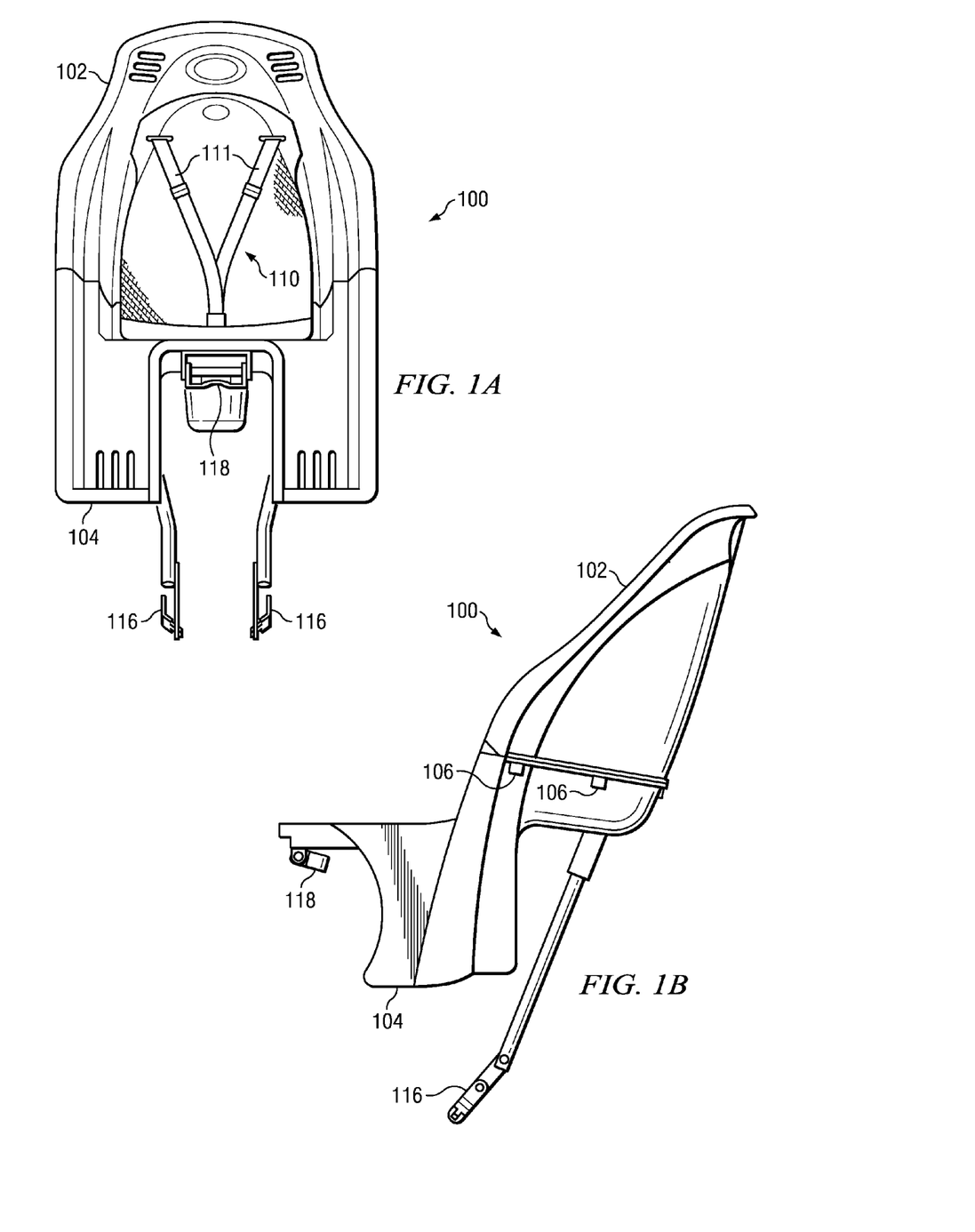
FIG. 1A-1C illustrate various views of an example of a bicycle child seat according to an embodiment of the present disclosure.
Figure 1C:
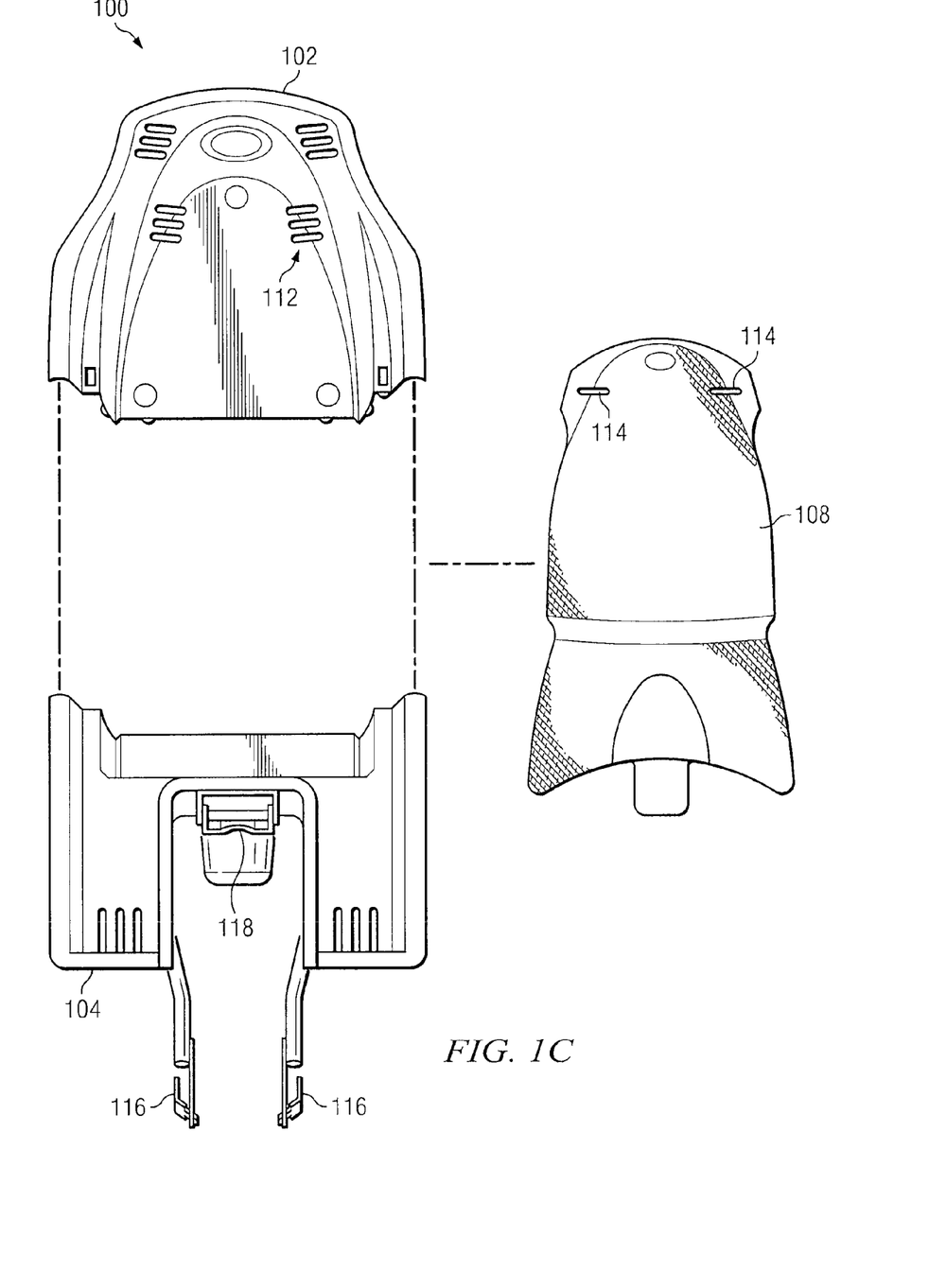
Figure 2A:
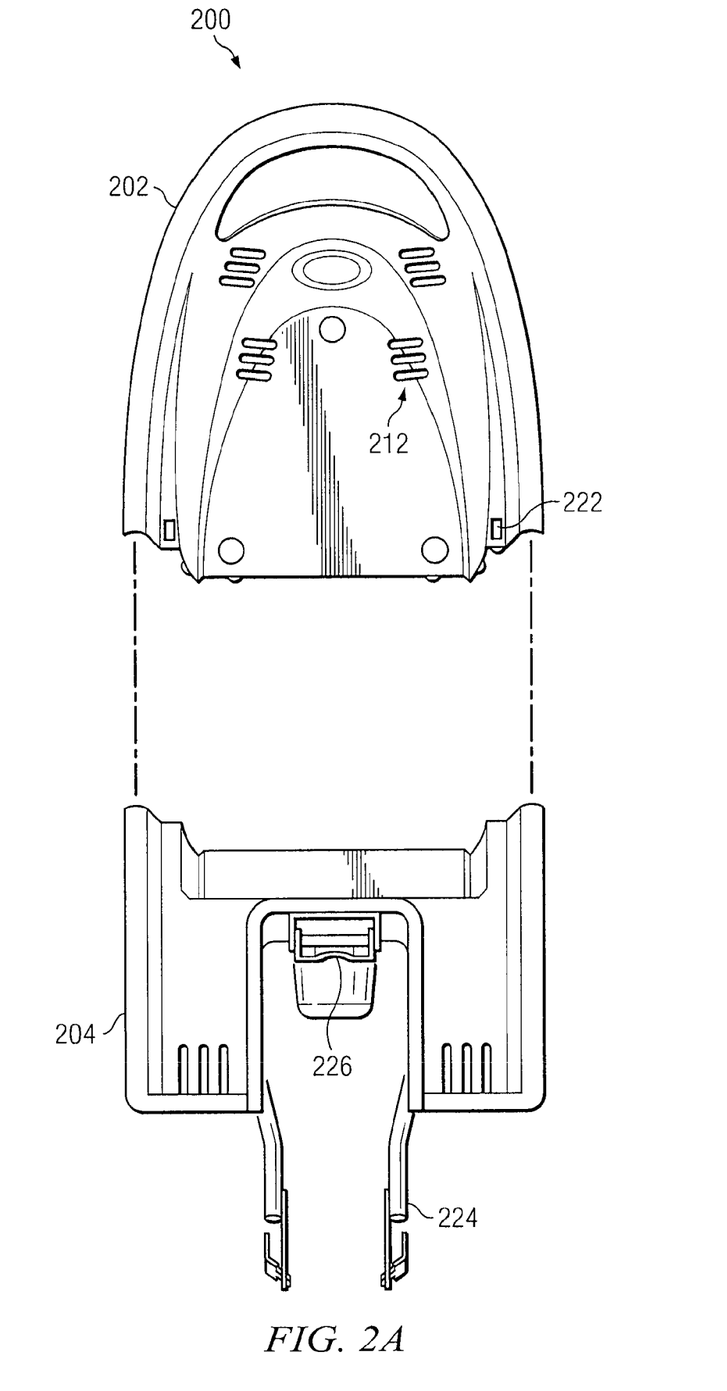
FIG. 2A-2D illustrate various views of an example of a bicycle child seat for use with a first child according to an embodiment of the present disclosure.
Figure 2B:
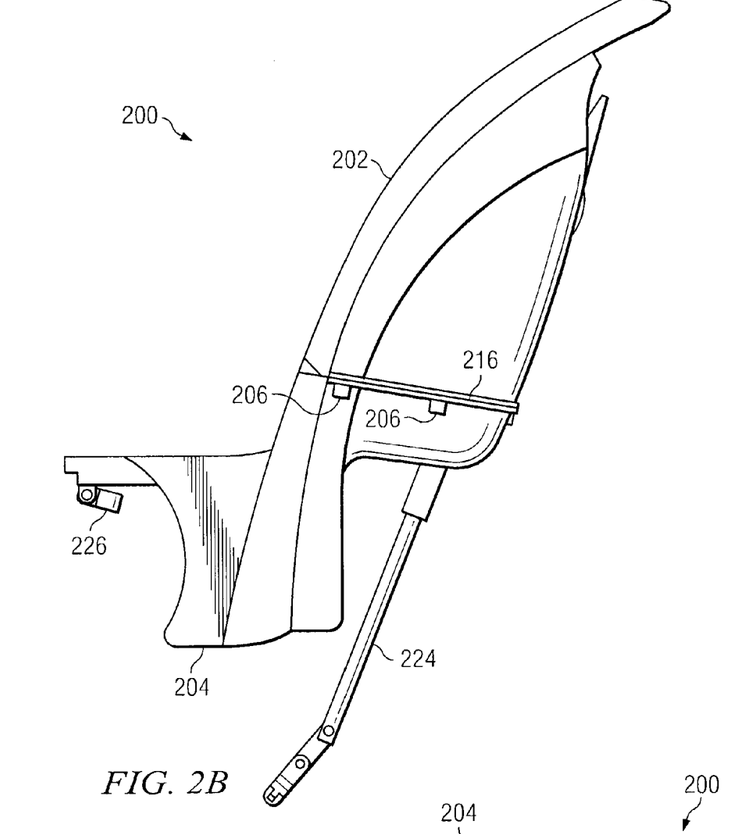
Figure 2C:
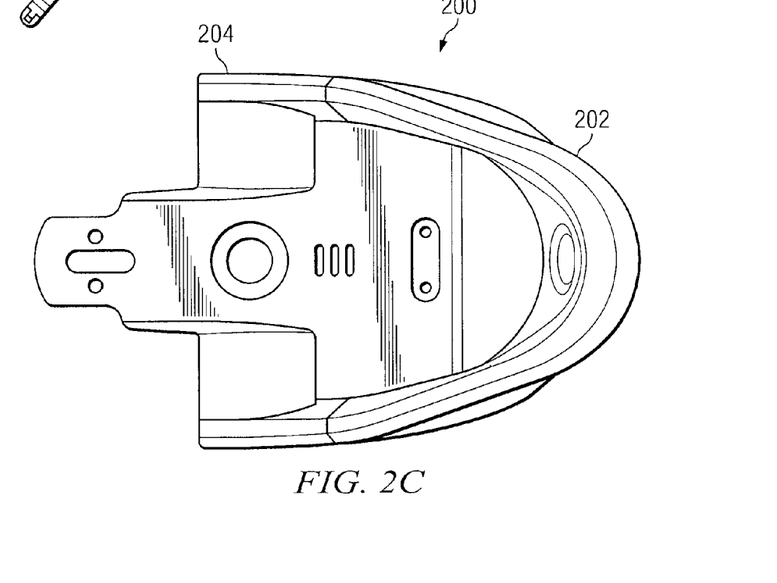
Figure 2D:
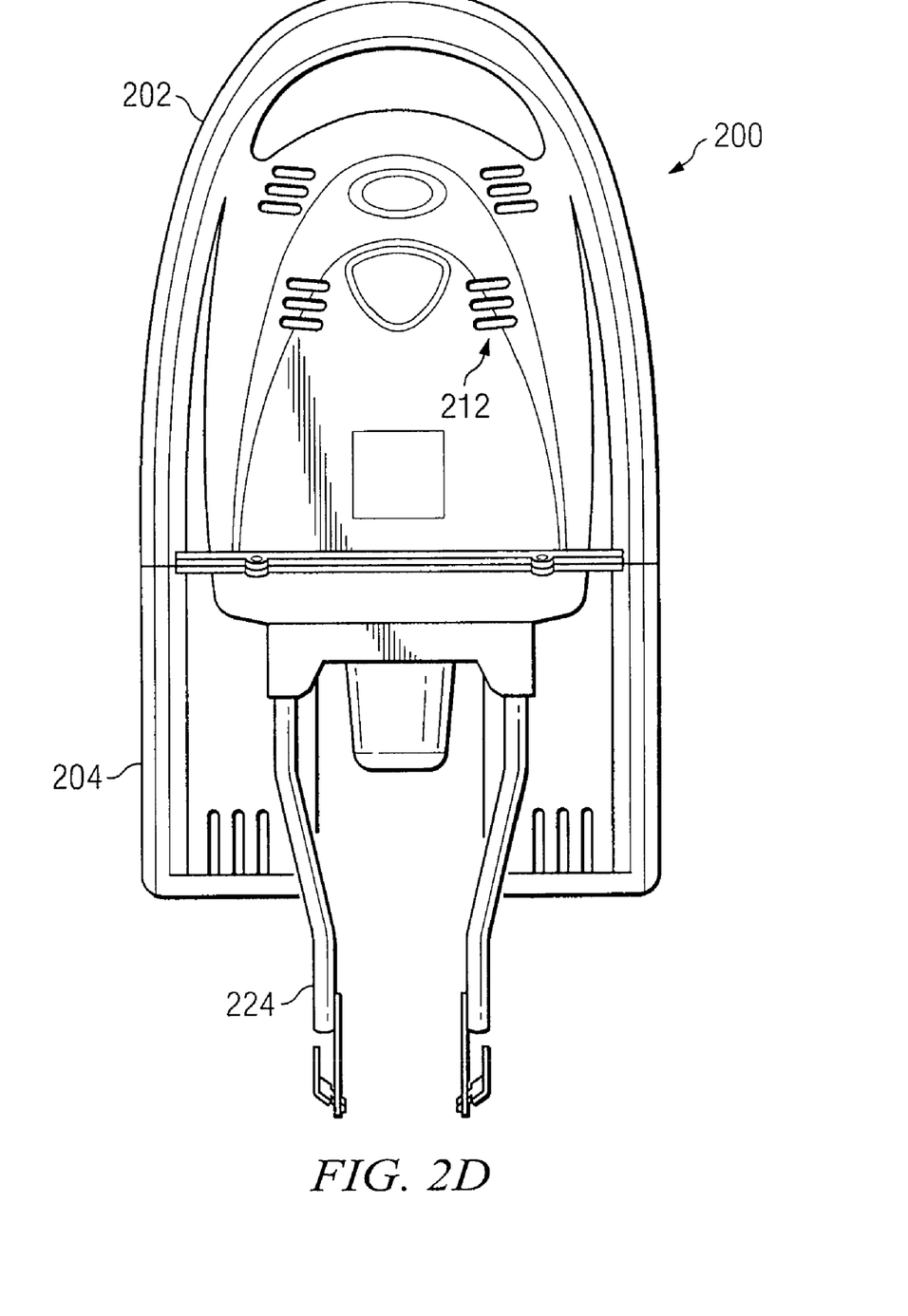

FIG. 1A-1C illustrate various views of an example of a bicycle child seat according to an embodiment of the present disclosure. Bicycle child seat 100 may include an upper portion 102 and a lower portion 104 that are separate parts which are coupled together for use. Separate upper and lower portions may allow for more convenient manufacturing, packaging and shipment by the manufacturer. In addition, separate portions may require smaller storage space for seat 100. Upper portion 102 may be connected to lower portion 104 using screws, bolts, or any other suitable attachment mechanism. More specifically, screws or bolts may be inserted through/into the seat 100 at attachment points 106 and tightened to connect upper portion 102 and lower portion 104.

Seat 100 may include padding 108 to provide comfort for a child seated in seat 100. Seat 100 may include a safety harness 110 to secure a child in seat 100. The belts 111 of the harness 110 may be attached to seat 100 through slots 112 and may pass through slots 114 in padding 108. Furthermore, seat 100 may include bicycle frame attachment mechanism 116 and saddle post attachment mechanism 118 for securing seat 100 to a bicycle. These mechanisms are illustrated and described in further detail below.

FIGS. 2A-2D illustrate various views of an example of a bicycle child seat for use with a first child according to an embodiment of the present disclosure. Seat 200 may include bicycle frame attachment mechanism 224 and saddle post attachment mechanism 226 for securing seat 200 to a bicycle. These mechanisms are illustrated and described in further detail below. Seat 200 also may include padding 208 to provide comfort for the child seated in seat 200. Seat 200 may include a safety harness 210 to secure a child in seat 200. The belts 211 of the harness 210 may be attached to seat 200 through slots 212 and may pass through slots 214 in padding 208.

As discussed in relation to seat 100, bicycle child seat 200 may include an upper portion 202 and a lower portion 204 that are separate parts which are coupled together for use. Again, separate upper and lower portions may provide more convenient manufacturing, packaging and shipment by the manufacturer. It may also require less space for storage by the user. Upper portion 202 may be connected to lower portion 204 using screws, bolts, or any other suitable attachment mechanism. More specifically, screws or bolts may be inserted through/into the seat 200 at attachment points 206 and tightened to connect upper portion 202 and lower portion 204.

Figures 3A, 3B:
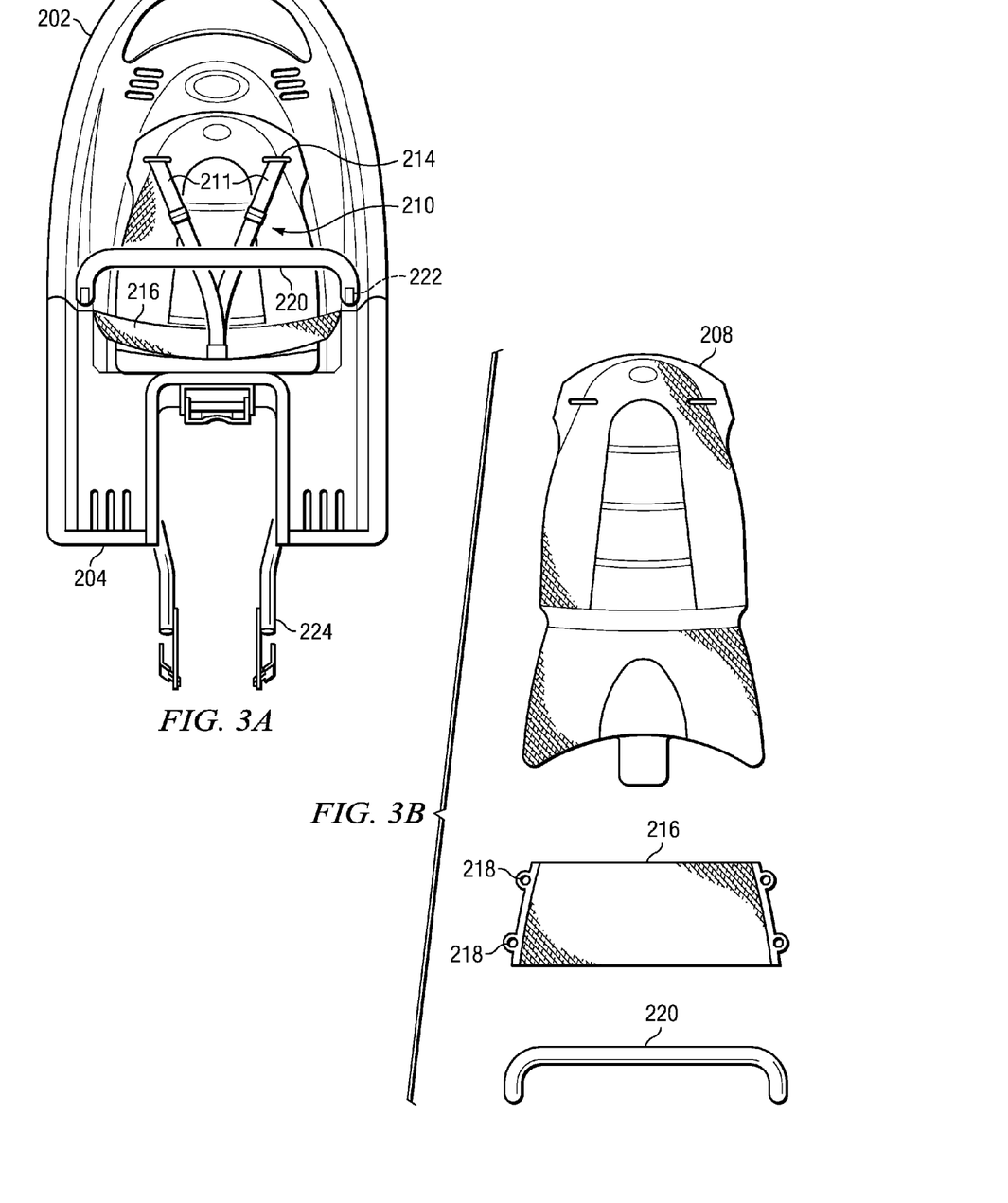
FIG. 3A illustrates an example of equipment used to convert a bicycle child seat for use with a second child according to an embodiment of the present disclosure.
FIG. 3B shows an exploded view of the equipment shown in FIG. 3A.

FIG. 3A illustrates an example of equipment used to convert bicycle child seat 200 for use with a second child according to an embodiment of the present disclosure. FIG. 3B shows an exploded view of the equipment shown in FIG. 3A. As shown, seat 200 may include a hammock 216 suspended over the seating area of the lower portion 204 to provide a seat sized for a second or smaller child. For example, attachment holes 218 of hammock 216 may be aligned with attachment points 206 and thus hammock may be secured between upper portion 202 and lower portion 204. Seat 200 may also include a handlebar 220 that may be inserted into attachment points 222 to provide further security for a child riding in seat 200.

Figure 4:
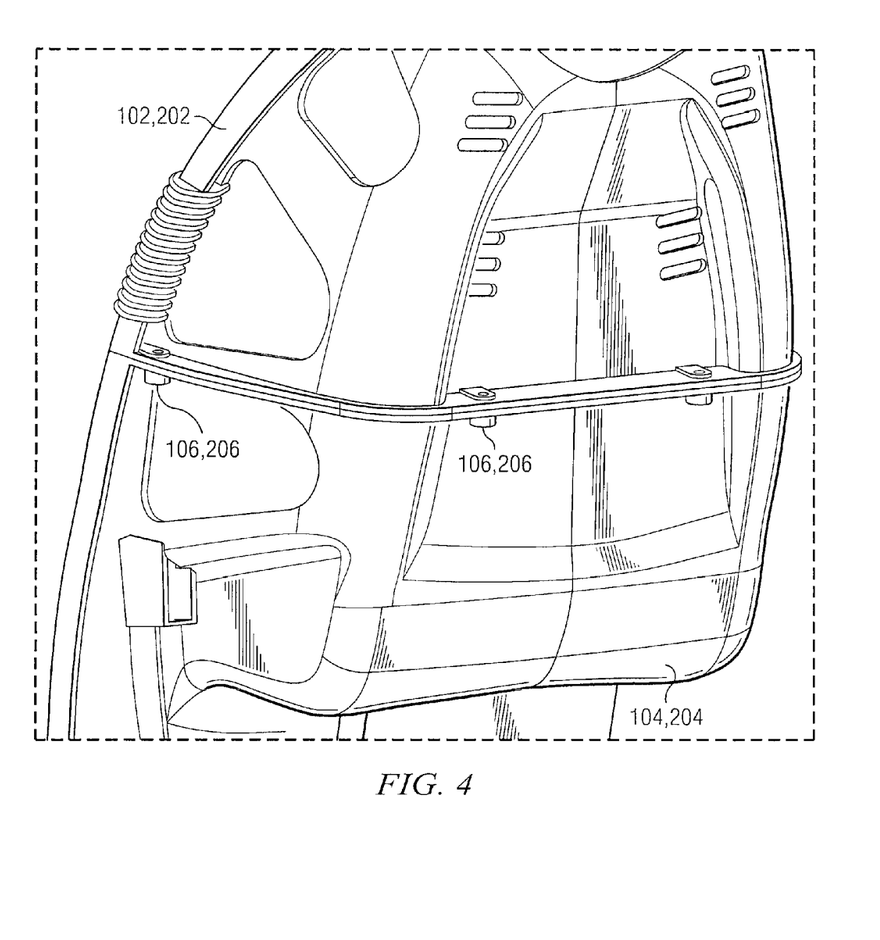
FIG. 4 illustrates a detail view of an example of a child bicycle seat according to an embodiment of the present disclosure.

FIG. 4 illustrates a detail view of an example of a child bicycle seat according to an embodiment of the present disclosure. FIG. 4 illustrates one example of connectors used in the attachment of the upper portion and lower portion of a seat (such as portions 102 and 104 or 202 and 204) according to certain embodiments. As illustrated, a screw or bolt may be inserted through a hole in the upper portion and into an attachment points in the lower potion (such as attachment points 106 and 206). In particular embodiments, the attachment points may each include a built-in bolt (or other receiver) that receives the screw or bolt and allows the upper and lower potions to be tightened together. Any other suitable attachment mechanism could also be used.

Figure 5A:
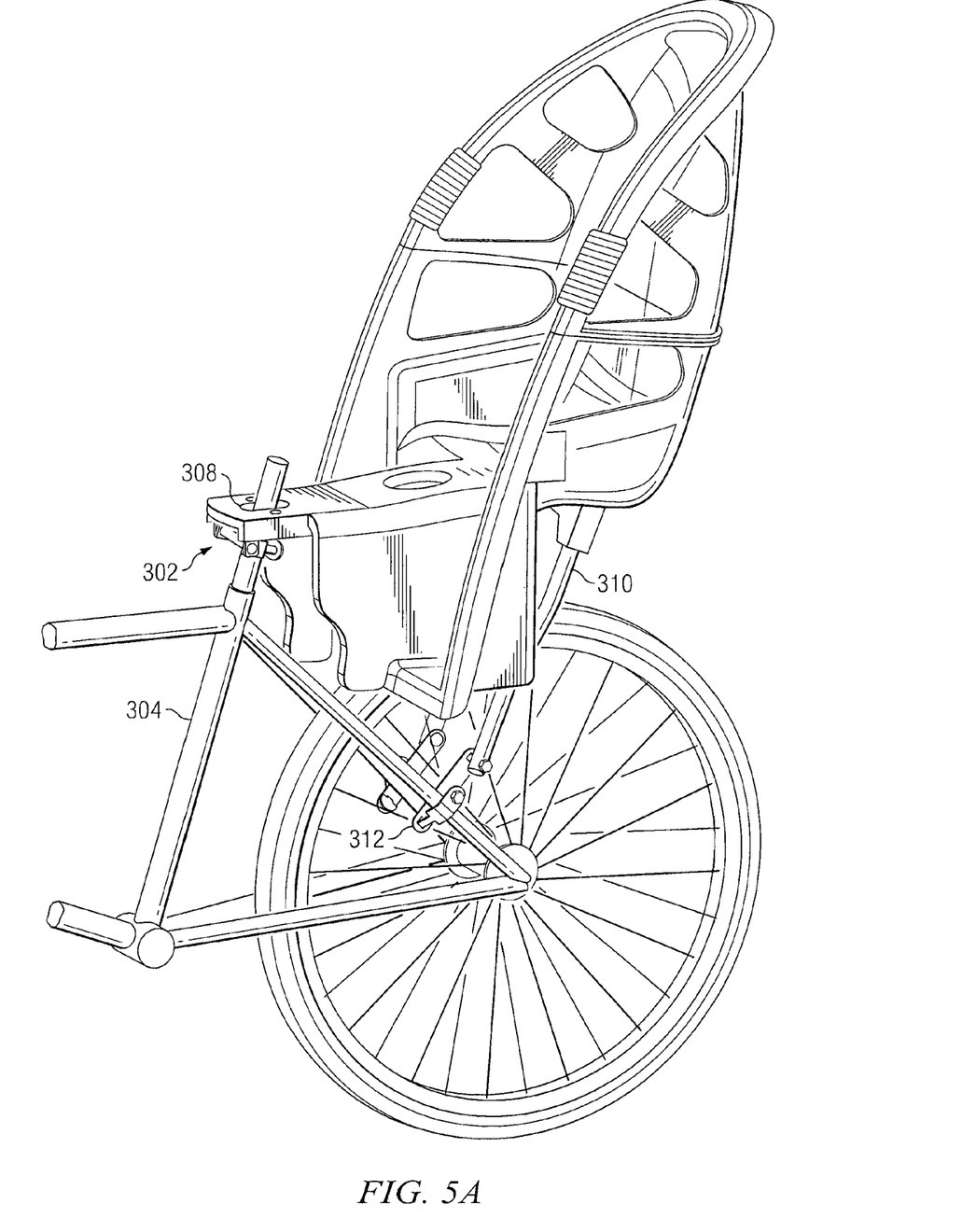
FIGS. 5A-5C illustrate an example system for attaching a bicycle child seat to a bicycle according to an embodiment of the present disclosure.
Figure 5B:
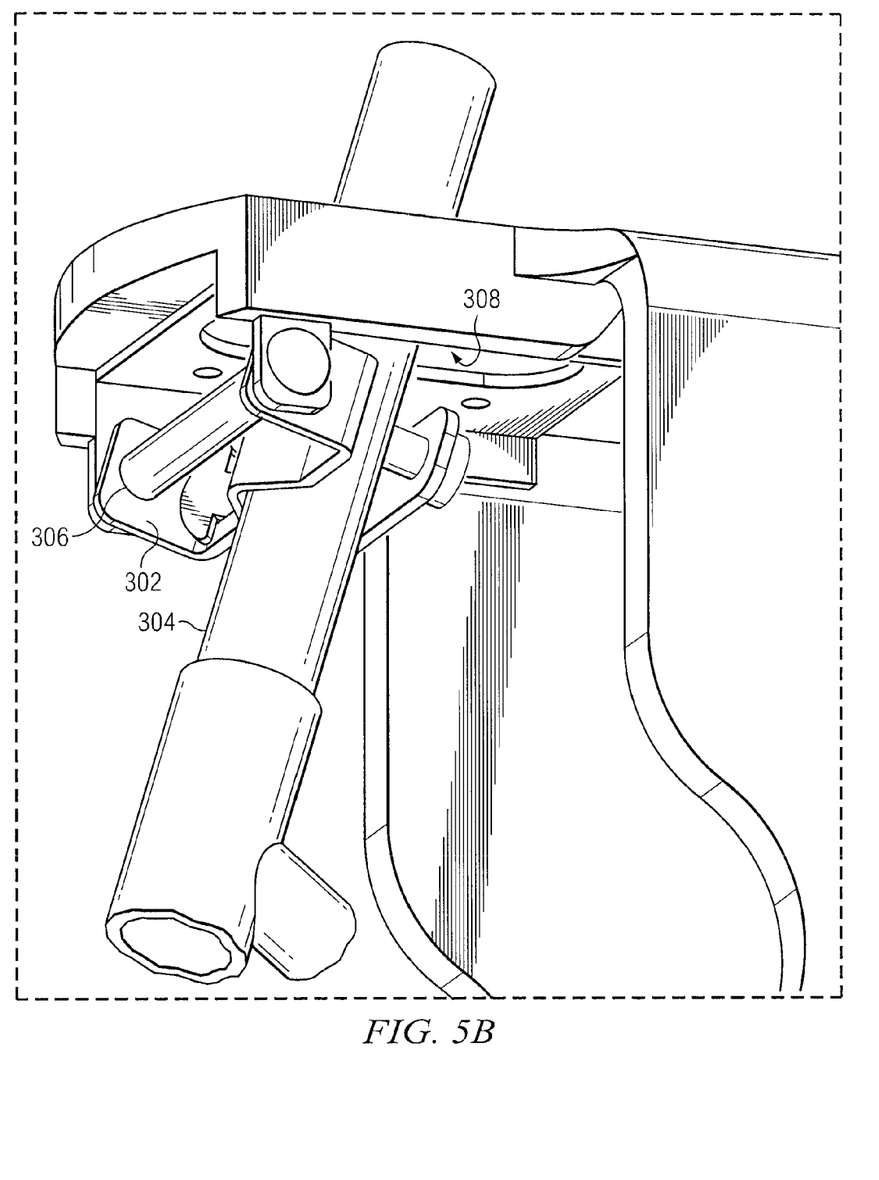
Figure 5C:
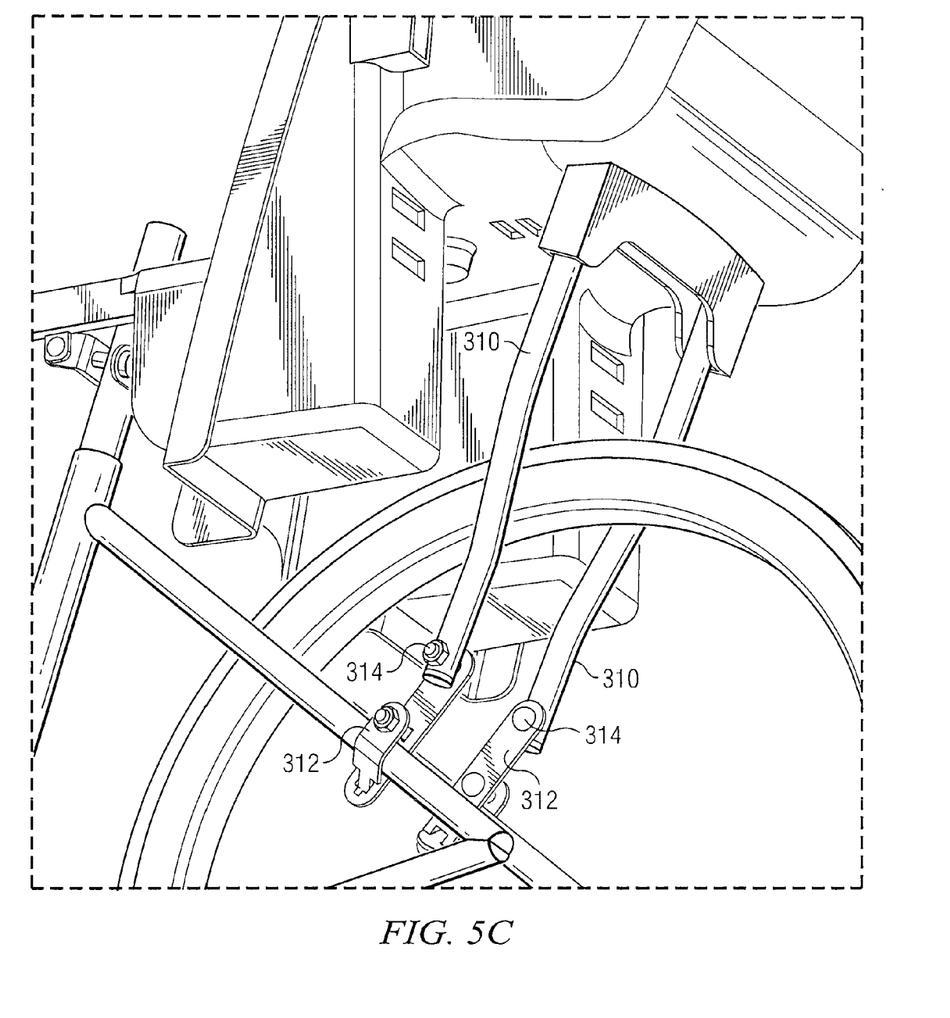

FIGS. 5A-5C illustrate an example system for attaching a bicycle child seat to a bicycle according to an embodiment of the present disclosure. As noted above, the attachment mechanism may include a bicycle frame attachment mechanism and saddle post attachment mechanism. For ease of reference, the term "saddle" refers to the bicycle seat used by a primary rider and the term "seat" will only be used in reference to the various embodiments of a bicycle child seat described herein.

As shown more closely in FIG. 5B, the saddle post attachment mechanism (such as saddle post attachment mechanisms 118 and 226) may be a metal clamp 302 that fits around the saddle post 304 of a bicycle. The clamp 302 may be adjustable to fit different seat post diameters and angles, as illustrated (for example, the clamp 302 may be attached to the bicycle child seat at a pivot point 306 to allow angular adjustment). One or more screws or bolts may used to tighten the clamp 302 around the saddle post 304.

Furthermore, in this particular embodiment, the lower portion of the seat includes a hole 308 through which the saddle post 304 passes. Thus, if the saddle post attachment mechanism becomes loose or fails, the bicycle child seat will still be secured to the bicycle (with a bicycle saddle—not illustrated—connected on top of the seat post holding the child seat on the bicycle). As shown more closely in FIG. 5C, the example bicycle frame attachment mechanism (such as seat attachment mechanisms 116 and 224) may include two arms 310 that connect to the rear of the bicycle frame (sometimes referred to as the "seat stay" of the frame) using clamps 312. One or more screws or bolts are used to tighten the clamps 312 around the seat stays. The clamps 312 may be attached to the arms 310 at pivot points 314 to allow angular adjustment of the clamps to match the angle of the seat stays.

Although the present invention and its advantages have been described in detail, it should be understood that various changes, substitutions and alternations can be made herein without departing from the spirit and scope of the invention as defined by the following claims. For example, the teachings of the present disclosure may be used in a bicycle child seat configured to attach to the front of a bicycle. As another example, teachings of the present disclosure may provide benefits for use with other accessories for use with a bicycle.

What is claimed:

1. A bicycle child seat configured to attach to a bicycle including a saddle, a seat post, and two seat stays, the bicycle child seat comprising:
    a seat sized for a child;
    a safety harness configured to secure the child in the bicycle child seat;
    a bicycle frame attachment mechanism; and
    a seat post attachment mechanism;
    wherein the seat defines a hole within the seat configured to slide over the seat post of the bicycle and sized such that the seat cannot be removed from the bicycle without removing a bicycle seat from the seat post of the bicycle.

2. A bicycle child seat according to claim 1, wherein the bicycle frame attachment mechanism comprises:
    two arms; and
    a clamp located at the lower end of each arm;
    wherein the clamps are configured to attach to the two seat stays.

3. A bicycle child seat according to claim 1, further comprising the bicycle frame attachment mechanism configured to attach to a rear axle of the bicycle.

4. A bicycle child seat according to claim 1, further comprising the bicycle frame attachment mechanism configured to attach the bicycle child seat to a variety of seat posts with varying diameters.

5. A bicycle child seat according to claim 1, wherein the seat post attachment mechanism includes a clamp configured to attach the bicycle child seat to a variety of seat posts with varying diameters.

\* \* \* \* \*